(12) United States Patent
Husemann et al.

(10) Patent No.: US 7,498,078 B2
(45) Date of Patent: Mar. 3, 2009

(54) LAYERED PRESSURE-SENSITIVE ADHESIVE

(75) Inventors: Marc Husemann, Hamburg (DE); Stephen Zoellner, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 11/013,559

(22) Filed: Dec. 16, 2004

(65) Prior Publication Data
US 2005/0196609 A1 Sep. 8, 2005

(30) Foreign Application Priority Data
Dec. 16, 2003 (DE) .............................. 103 59 350

(51) Int. Cl.
*B32B 7/12* (2006.01)
*B32B 27/30* (2006.01)
(52) U.S. Cl. .............................. 428/355 AC; 428/343; 428/354; 264/464
(58) Field of Classification Search ................. 428/354, 428/343, 355 AC, 40.1
See application file for complete search history.

(56) References Cited

U.S. PATENT DOCUMENTS

| RE24,906 | E | * | 12/1960 | Ulrich | .................... | 526/328.5 |
| 4,581,429 | A | | 4/1986 | Solomon et al. | | |
| 5,385,772 | A | * | 1/1995 | Slovinsky et al. | ........... | 428/220 |
| 5,767,210 | A | | 6/1998 | Lecomte et al. | | |
| 5,789,487 | A | | 8/1998 | Matyjaszewski et al. | | |
| 5,854,364 | A | | 12/1998 | Senninger et al. | | |
| 5,919,871 | A | | 7/1999 | Nicol et al. | | |
| 5,945,491 | A | | 8/1999 | Matyjaszewski et al. | | |
| 6,114,482 | A | | 9/2000 | Senninger et al. | | |
| 6,958,186 | B2 | * | 10/2005 | Husemann et al. | .......... | 428/346 |
| 2001/0007003 | A1 | | 7/2001 | Karim et al. | | |

2003/0096075 A1 5/2003 Dollase et al.
(Continued)

FOREIGN PATENT DOCUMENTS
DE 199 49 352 A1 4/2000
(Continued)

OTHER PUBLICATIONS

Akira Katakura et al., "Double-Sided Adhesive Tape", English translation of JP 2002-194301, Jul. 10, 2002.*
(Continued)

*Primary Examiner*—Hai Vo
*Assistant Examiner*—Anish Desai
(74) *Attorney, Agent, or Firm*—Norris McLaughlin & Marcus PA

(57) ABSTRACT

The invention relates to a pressure-sensitive adhesive. Provision is made for this pressure-sensitive adhesive to comprise
(a) a first layer of a first polyacrylate pressure-sensitive adhesive containing at least 50% by weight, based on the first polyacrylate pressure-sensitive adhesive, of an acrylic and/or methacrylic ester of the formula $CH_2=CH(R_1)(COOR_2)$;
(b) a second layer comprising
  (b1) a polyacrylate containing at least 50% by weight, based on the polyacrylate, of an acrylic and/or methacrylic ester of the formula $CH_2=CH(R_1)(COOR_2)$, and
  (b2) at least 15% by weight, based on the second layer, of chalk; and
(c) a third layer of a second polyacrylate pressure-sensitive adhesive containing at least 50% by weight, based on the second polyacrylate pressure-sensitive adhesive, of an acrylic and/or methacrylic ester of the formula $CH_2=CH(R_1)(COOR_2)$
in each formula $R_1$ is H or $CH_3$ and $R_2$ is an alkyl chain having 1 to 20 carbon atoms.

10 Claims, 1 Drawing Sheet

U.S. PATENT DOCUMENTS

2003/0113533 A1 6/2003 Husemann et al.
2003/0180531 A1* 9/2003 Husemann et al. .......... 428/354

FOREIGN PATENT DOCUMENTS

| | | |
|---|---|---|
| DE | 101 50 197 A1 | 5/2003 |
| DE | 101 53 677 A1 | 5/2003 |
| EP | 0 735 052 A2 | 10/1996 |
| EP | 0 736 585 A1 | 10/1996 |
| EP | 0 824 110 A1 | 2/1998 |
| EP | 0 824 111 A1 | 2/1998 |
| EP | 0 826 698 A1 | 3/1998 |
| EP | 0 841 346 A1 | 5/1998 |
| EP | 0 850 957 A1 | 7/1998 |
| EP | 1 302 521 A2 | 4/2002 |
| WO | WO 96/24620 | 8/1996 |
| WO | WO 98/01478 | 1/1998 |
| WO | WO 98/13392 | 4/1998 |
| WO | WO 98/44008 | 10/1998 |

OTHER PUBLICATIONS

German Search Report.
Patent Abstract of Japan Publication No. 2002194301 A; Jul. 10, 2002; Applicant: Teraoka Sesakusho.
Patent Abstract of Japan Publication No. 2002140008 A; May 17, 2002; Applicant: Toppan Forms Co Ltd.

* cited by examiner

LAYERED PRESSURE-SENSITIVE ADHESIVE

The invention relates to a pressure-sensitive adhesive, to a process for its preparation and to uses of such an adhesive. The invention relates in particular to an acrylate pressure-sensitive adhesive.

For industrial pressure-sensitive adhesive tape applications it is very common to find polyacrylate pressure-sensitive adhesives used. Polyacrylates possess a variety of advantages over other elastomers. They are highly stable to UV light, oxygen and ozone. Synthetic and natural rubber adhesives generally contain double bonds, which make these adhesives unstable to the aforementioned environmental influences. A further advantage of polyacrylates is their serviceability across a relatively wide temperature range.

Polyacrylate pressure-sensitive adhesives (polyacrylate PSAs) are generally prepared in solution by free radial polymerization. The polyacrylates are coated onto the corresponding backing material from solution or from the melt via a coating bar and are subsequently dried. The polymer is crosslinked in order to raise the cohesion. Curing is thermal, by UV crosslinking or by EB (standing for "electron beams"). The operation described is relatively costly, and accordingly the double-sided PSA tapes based on acrylic PSAs are relatively expensive.

An improvement to the properties, albeit one entailing an increase in the costs, is achieved by means of a foamed polyacrylate backing. These products are available commercially under the designation VHB (very high bonding) from 3M.

A further disadvantage of double-sided adhesive tapes is the production operation, since in one step at least the PSA is first coated onto an in-process liner and then the PSA is laminated onto the carrier of the double-sided PSA tape.

Additionally, transfer tapes have been available commercially for a long time already. A transfer tape consists of a PSA coated directly onto the release liner. In order to bond substrates the PSA is first applied to one substrate, the release liner is removed, and then the second substrate to be bonded is applied, leaving only the PSA film between the two substrates. These PSAs can be employed for a temperature range up to 200° C. For these applications it is preferred to use straight acrylic transfer tapes such as 3M 467 or 468, for example, although owing to their single-coat construction such tapes do not possess high bond strengths.

It is an object of the invention to overcome the disadvantages of the prior art. The intention is in particular to specify a pressure-sensitive adhesive which has high bond strengths, is able to replace the prior art double-sided PSA tapes, is inexpensive in comparison to them, and additionally can be used across a broad temperature range. The intention is further to specify a process for preparing such an adhesive and also a use for such an adhesive.

This object is achieved by the features described herein below.

The invention provides a pressure-sensitive adhesive comprising (a) a first layer of a first polyacrylate pressure-sensitive adhesive containing at least 50% by weight, based on the first polyacrylate pressure-sensitive adhesive, of an acrylic and/or methacrylic ester of the formula $CH_2=CH(R_1)(COOR_2)$ where $R_1$ is H or $CH_3$ and $R_2$ is a linear, branched or cyclic alkyl chain having 1 to 20 carbon atoms;

(b) a second layer comprising
   (b1) a polyacrylate containing at least 50% by weight, based on the polyacrylate, of an acrylic and/or methacrylic ester of the formula $CH_2=CH(R_1)(COOR_2)$ where $R_1$ is H or $CH_3$ and $R_2$ is a linear, branched or cyclic alkyl chain having 1 to 20 carbon atoms, and
   (b2) at least 15% by weight, based on the second layer, of chalk; and (c) a third layer of a second polyacrylate pressure-sensitive adhesive containing at least 50% by weight, based on the second polyacrylate pressure-sensitive adhesive, of an acrylic and/or methacrylic ester of the formula $CH_2=CH(R_1)(COOR_2)$ where $R_1$ is H or $CH_3$ and $R_2$ is a linear, branched or cyclic alkyl chain having 1 to 20 carbon atoms.

The pressure-sensitive adhesive of the invention is accordingly a three-layer acrylate PSA. In the text below the first layer is referred to as layer A, the second layer as layer B and the third layer as layer C.

The PSA of the invention has a three-layer construction, with layer B lying between layer A and layer C. In this way it is possible to replace the carrier that is required in the case of double-sided PSA tapes, thereby achieving the object of the present invention.

Figure 1:
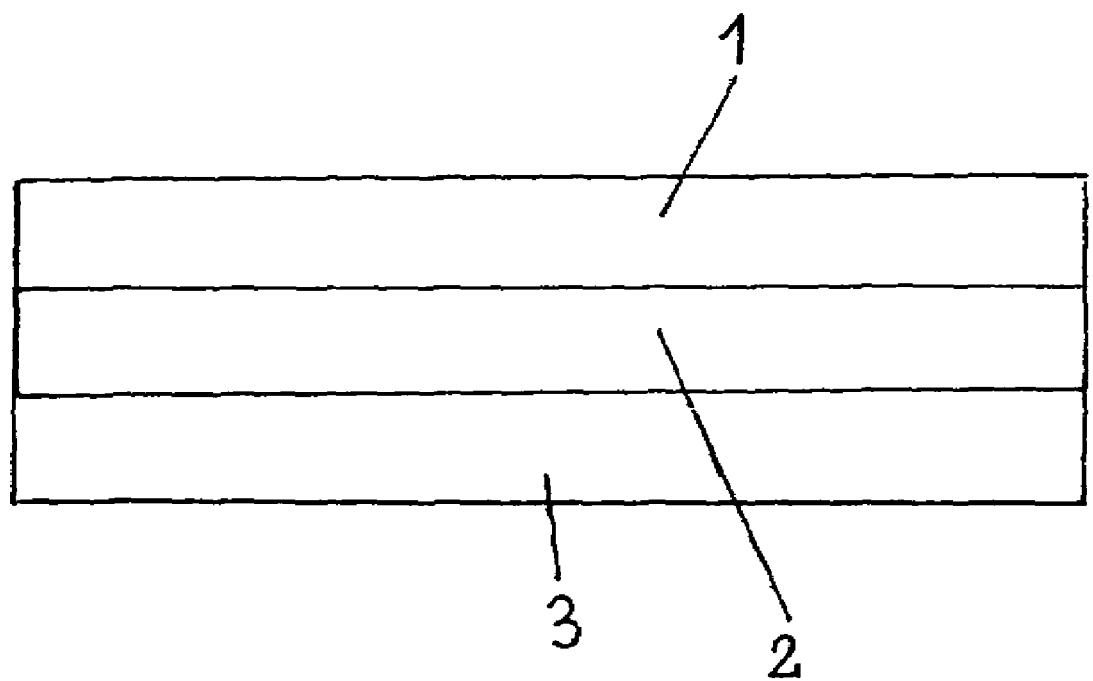
FIG. 1 shows in diagrammatic form a three-layer PSA of the invention, with reference 1 identifying the first layer (layer A), 2 identifying the second layer (layer B) and 3 identifying the third layer (layer C).

In one preferred embodiment of the invention layer A is identical to layer C.

The monomers for layer A and layer C are preferably selected such that the resulting polymers can be used as PSAs at room temperature or higher temperatures, in particular such that the resultant polymers possess pressure-sensitive adhesion properties in accordance with the "Handbook of Pressure Sensitive Adhesive Technology" by Donatas Satas (van Nostrand, New York 1989).

Furthermore, depending on desired properties, the PSA of the invention can possess different layer thicknesses. Generally speaking, higher layer thicknesses can be used to raise bond strength. Cohesion is generally raised by selecting thinner PSA layers A and C. In one preferred version the thickness of layer A is between 5 and 150 µm, very preferably between 10 and 100 µm, that of layer B is between 10 µm and 1.5 mm, very preferably between 50 µm and 1000 µm, and that of layer C is between 5 and 150 µm, very preferably between 10 and 100 µm. In one very preferred version the thicknesses of layers A and C are the same.

Composition of Layers A, B and C

In one preferred embodiment acrylic or methacrylic monomers are used for the three layers A, B and C that are composed of acrylic and methacrylic esters in which the alkyl groups contain 4 to 14 carbon atoms, preferably 4 to 9 carbon atoms. Specific examples, without wishing to be limited by this list, are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate and behenyl acrylate and the branched isomers thereof, such as isobutyl acrylate, 2-ethylhexyl acrylate, 2-ethylhexyl methacrylate, isooctyl acrylate and isooctyl methacrylate, for example.

Further classes of compound which can be used are monofunctional acrylates and methacrylates of bridged cycloalkyl alcohols composed of at least 6 carbon atoms. The cycloalkyl alcohols can also be substituted, by C-1-6 alkyl groups, halogen atoms or cyano groups, for example. Specific examples are cyclohexyl methacrylates, isobornyl acrylate, isobornyl methacrylates and 3,5-dimethyladamantyl acrylate.

Further comonomers which can be used in addition to the abovementioned acrylates and methacrylates include moderate basic monomers such as N,N-dialkyl-substituted amides, such as N,N-dimethylacrylamide, N,N-dimethylmethacrylamide, N-tert-butylacrylamide, N-vinylpyrrolidone, N-vinyllactam, dimethylaminoethyl methacrylate, dimethylaminoethyl acrylate, diethylaminoethyl methacrylate, diethylaminoethyl acrylate, N-methylol-methacrylamide, N-(butoxymethyl)methacrylamide, N-methylolacrylamide, N-(ethoxy-methyl)acrylamide and N-isopropylacrylamide, this listing not being conclusive.

Further examples of comonomers are maleic anhydride, itaconic anhydride, glyceridyl methacrylate, phenoxyethyl acrylate, phenoxyethyl methacrylate, 2-butoxyethyl methacrylate, 2-butoxyethyl acrylate, cyanoethyl methacrylate, cyanoethyl acrylate, glyceryl methacrylate and tetrahydrofurfuryl acrylate, this listing not being conclusive.

In another, very preferred embodiment comonomers used include vinyl esters, vinyl ethers, vinyl halides, vinylidene halides, vinyl compounds having aromatic rings and heterocycles in a position. Here again a number of examples may be mentioned, without the listing being conclusive: vinyl acetate, vinylformamide, vinylpyridine, ethyl vinyl ether, vinyl chloride, vinylidene chloride and acrylonitrile.

Moreover, in another very preferred embodiment, photoinitiators having a copolymerizable double bond are used. Suitable photoinitiators include Norrish I and II photoinitiators. Examples are benzoin acrylate and an acrylated benzophenone from UCB (Ebecryl P 36®). In principle it is possible to copolymerize any photoinitiators known to the skilled worker which are able to crosslink the polymer via a radical mechanism under UV irradiation. An overview of possible photoinitiators for use which can be functionalized with a double bond is given in Fouassier: "Photoinitiation, Photopolymerization and Photocuring: Fundamentals and Applications", Hanser-Verlag, Munich 1995. For further details refer to Carroy et al. in "Chemistry and Technology of UV and EB Formulation for Coatings, Inks and Paints", Oldring (Ed.), 1994, SITA, London.

In another preferred embodiment the comonomers described are supplemented by monomers which possess a high static glass transition temperature. Suitable components include aromatic vinyl compounds, such as styrene, for example, with the aromatic nuclei preferably being composed of $C_4$ to $C_{18}$ units and also being able to include heteroatoms. Particularly preferred examples are 4-vinylpyridine, N-vinylphthalimide, methylstyrene, 3,4-dimethoxystyrene, benzyl acrylate, benzyl methacrylate, phenyl acrylate, phenyl methacrylate, t-butylphenyl acrylate, t-butylphenyl methacrylate, 4-biphenylyl acrylate and methacrylate, 2-naphthyl acrylate and methacrylate, and mixtures of these monomers, this listing not being conclusive.

In one very preferred embodiment of the invention the comonomer composition of layer B, apart from the addition of the chalk filler, is identical with those of layers A and C. In this case layer B differs only in the addition of the chalk filler.

A further possibility is to mix resins into the inventive polymers of the layers A, B and C. Tackifying resins to be added include without exception all known tackifier resins which can be employed, and those described in the literature. As representatives mention may be made of pinene resins, indene resins and rosins, their disproportionated, hydrogenated, polymerized and esterified derivatives and salts, the aliphatic and aromatic hydrocarbon resins, terpene resins and terpene-phenolic resins, and C5, C9 and other hydrocarbon resins. Any desired combinations of these and further resins can be employed in order to adjust the properties of the resultant adhesive in accordance with what is desired. Generally speaking, it is possible to use resins which are compatible with (soluble in) the corresponding polyacrylate; reference may be made in particular to all aliphatic, aromatic and alkylaromatic hydrocarbon resins, hydrocarbon resins based on single monomers, hydrogenated hydrocarbon resins, functional hydrocarbon resins and natural resins. Express reference is made to the depiction of the state of the art in the "Handbook of Pressure Sensitive Adhesive Technology" by Donatas Satas (van Nostrand, 1989).

A further possible option is to add plasticizers, nucleators, expandants, compounders and/or ageing inhibitors, in the form for example of primary and secondary antioxidants or in the form of light stabilizers.

In addition it is possible to mix in crosslinkers and promoters for the crosslinking of the layers A, B and C. Suitable crosslinkers for electron beam crosslinking and UV crosslinking are, for example, difunctional or polyfunctional acrylates, difunctional or polyfunctional isocyanates (including those in block form) and difunctional or polyfunctional epoxides.

For optional crosslinking—if not indeed preferred crosslinking—with UV light it is possible to add UV-absorbing photoinitiators to the layers A, B or C. Useful photoinitiators which can be used very effectively are benzoin ethers, such as benzoin methyl ether and benzoin isopropyl ether, substituted acetophenones, such as 2,2-diethoxyacetophenone (available as Irgacure 651® from Ciba Geigy), 2,2-dimethoxy-2-phenyl-1-phenylethanone and dimethoxyhydroxyacetophenone, substituted a-ketols, such as 2-methoxy-2-hydroxypropiophenone, aromatic sulphonyl chlorides, such as 2-naphthylsulphonyl chloride, and photoactive oximes, such as 1-phenyl-1,2-propanedione 2-(O-ethoxycarbonyl) oxime, for example.

The abovementioned photoinitiators and others which can be used, and others of the Norrish I or Norrish II type, may contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholinyl ketone, aminoketone, azobenzoin, thioxanthone, hexaarylbisimidazole, triazine or fluorenone, it being possible for each of these radicals to be additionally substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details it is possible to consult Carroy et al. in "Chemistry and Technology of UV and EB Formulation for Coatings, Inks and Paints", Oldring (Ed.), 1994, SITA, London.

Layer B ought to contain at least 15% by weight but not more than 60% by weight of chalk, based on layer B. In one preferred embodiment Mikrosohl chalk is used. As a result of the addition of chalk, layer B is able to lose its pressure-sensitive adhesion properties. In this case, however, the elasticity properties of layer B should be retained.

Process for Producing Layers A, B and C

For the polymerization the monomers of layers A and C are selected such that the resultant polymers can be used as PSAs at room temperature or higher temperatures, especially such that the resultant polymers possess pressure-sensitive adhesion properties in accordance with the "Handbook of Pressure Sensitive Adhesive Technology" by Donatas Satas (van Nostrand, New York 1989). In order to achieve a preferred polymer glass transition temperature, $T_g$, of $T_g \leq 25°$ C., and in accordance with the above remarks, the monomers are very preferably selected, and the quantitative composition of the monomer mixture advantageously chosen, such that the Fox equation (G1) (cf. T. G. Fox, Bull. Am. Phys. Soc. 1(1956) 123) indicates the desired $T_g$ for the polymer.

$$\frac{1}{T_g} = \sum_n \frac{w_n}{T_{g,n}} \quad \text{(G1)}$$

In this equation, n represents the serial number of the monomers used, $w_n$ the mass fraction of the respective monomer n (% by weight) and $T_{g,n}$ the respective glass transition temperature of the homopolymer of the respective monomer n, in K.

For preparing the poly(meth)acrylates of layers A, B and C it is advantageous to carry out conventional radical polymerizations. For the polymerizations proceeding in accordance with a radical mechanism it is preferred to employ initiator systems further comprising additional radical initiators for the polymerization, especially thermally decomposing, radical-forming azo or peroxo initiators. In principle, however, any customary initiators familiar to the person skilled in the art for acrylates are suitable. The production of C-centred radicals is described in Houben-Weyl, Methoden der Organischen Chemie, Vol. E 19a, pp. 60-147. These methods are preferably employed in analogy.

Examples of radical sources are peroxides, hydroperoxides and azo compounds; as a number of non-exclusive examples of typical radical initiators mention may be made here of potassium peroxodisulphate, dibenzoyl peroxide, cumene hydroperoxide, cyclohexanone peroxide, di-t-butyl peroxide, azodiisobutyronitrile, cyclohexylsulphonyl acetyl peroxide, diisopropyl percarbonate, t-butyl peroctoate and benzpinacol. In one very preferred version the radical initiator used is 1,1'-azobis(cyclohexanecarbonitrile) (Vazo 881™ from DuPont) or azodiisobutyronitrile (AIBN).

For the layer B the chalk filler can be admixed to the monomers prior to the polymerization and/or after the end of the polymerization.

The average molecular weights $M_w$ of the PSAs arising from the radical polymerization are very preferably selected so as to be situated within a range $M_w$ of from 50 000 to 2,000,000 g/mol. The average molecular weight is determined by size exclusion chromatography (GPC) or matrix-assisted laser desorption/ionization mass spectrometry (MALDI-MS).

The polymerization can be carried out in bulk, in the presence of one or more organic solvents, in the presence of water or in mixtures of organic solvents and water. The aim is to minimize the amount of solvent used. Suitable organic solvents are pure alkanes (e.g. hexane, heptane, octane, isooctane), aromatic hydrocarbons (e.g. benzene, toluene, xylene), esters (e.g. ethyl, propyl, butyl or hexyl acetate), halogenated hydrocarbons (e.g. chlorobenzene), alkanols (e.g. methanol, ethanol, ethylene glycol, ethylene glycol monomethyl ether) and ethers (e.g. diethyl ether, dibutyl ether) or mixtures thereof. A water-miscible or hydrophilic cosolvent can be added to the aqueous polymerization reactions in order to ensure that in the course of monomer conversion the reaction mixture is in the form of a homogeneous phase. Cosolvents which can be used with advantage for the present invention are selected from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulphides, sulphoxides, sulphones, alcohol derivatives, hydroxy ether derivatives, amino alcohols, ketones and the like and also derivatives and mixtures thereof.

The polymerization time, depending on conversion and temperature, is between 2 and 72 hours. The higher the reaction temperature which can be chosen, in other words the higher the thermal stability of the reaction mixture, the lower the reaction time that can be chosen.

In order to initiate the polymerization the introduction of heat is essential for the thermally decomposing initiators. For the thermally decomposing initiators the polymerization can be initiated by heating to from 50 to 160° C., depending on initiator type.

For the preparation it may also be of advantage to polymerize the polyacrylates in bulk. In this case the prepolymerization technique is especially suitable. The polymerization is initiated with UV light but taken only to a low conversion of about 10% to 30%. This polymer syrup can then be welded into films, for example (ice cube films are the most simple solution) and then polymerized on in water to a high conversion. The resulting pellets can then be employed as acrylate hotmelt adhesives, using for the melting operation, with particular preference, film materials which are compatible with the polyacrylate. For this preparation method as well it is possible to add the thermoconductive materials before or after the polymerization.

Another advantageous preparation process for the poly (meth)acrylates is that of anionic polymerization. In this case the reaction medium used comprises preferably inert solvents, such as aliphatic and cycloaliphatic hydrocarbons, for example, or else aromatic hydrocarbons.

In this case the living polymer is generally represented by the structure $P_L(A)$-Me, where Me is a metal from group I, such as lithium, sodium or potassium, and $P_L(A)$ is a growing polymer block of the monomers A. The molar mass of the polymer under preparation is controlled by the ratio of initiator concentration to monomer concentration. Examples of suitable polymerization initiators include n-propyllithium, n-butyllithium, sec-butyllithium, 2-naphthyllithium, cyclohexyllithium and octyllithium, this listing making no claim to completeness. Additionally, initiators based on samarium complexes are known for the polymerization of acrylates (Macromolecules, 1995, 28, 7886) and can be used here.

Moreover, it is also possible to employ difunctional initiators, such as 1,1,4,4-tetraphenyl-1,4-dilithiobutane or 1,1,4, 4-tetraphenyl-1,4-dilithioisobutane, for example. Coinitiators can likewise be used. Suitable coinitiators include lithium halides, alkali metal alkoxides and alkylaluminium compounds. In one very preferred version the ligands and coinitiators are selected such that acrylate monomers, such as n-butyl acrylate and 2-ethylhexyl acrylate, for example, can be polymerized directly and need not be generated in the polymer by transesterification with the corresponding alcohol.

Suitability for the preparation of poly(meth)acrylates having a narrow molecular weight distribution is also possessed by controlled radical polymerization methods. For the polymerization it is then preferred to use a control reagent of the general formula:

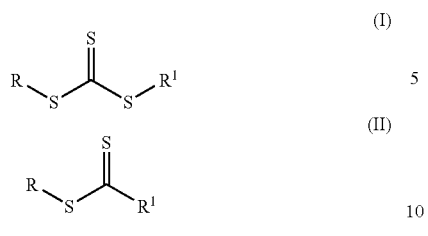

(I)

(II)

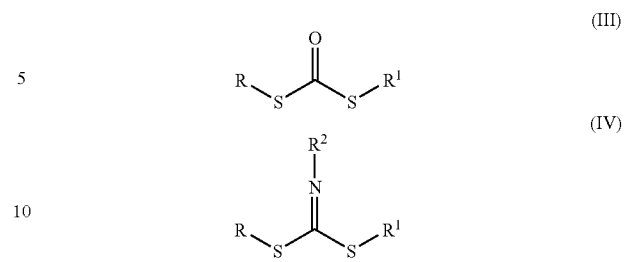

(III)

(IV)

in which R and $R^1$ independently of one another are selected from the group consisting of
- branched and unbranched $C_1$ to $C_{18}$ alkyl radicals, $C_3$ to $C_{18}$ alkenyl radicals and $C_3$ to $C_{18}$ alkynyl radicals;
- $C_1$ to $C_{18}$ alkoxy radicals;
- $C_1$ to $C_{18}$ alkyl radicals, $C_3$ to $C_{18}$ alkenyl radicals and $C_3$ to $C_{18}$ alkynyl radicals substituted by at least one OH group or halogen atom or silyl ether;
- $C_2$ to $C_{18}$ heteroalkyl radicals having at least one oxygen atom and/or one NR* group in the carbon chain, R* being any radical (especially an organic radical);
- $C_1$ to $C_{18}$ alkyl radicals, $C_3$ to $C_{18}$ alkenyl radicals and $C_3$ to $C_{18}$ alkynyl radicals substituted by at least one ester group, amine group, carbonate group, cyano group, isocyanato group and/or epoxide group and/or by sulphur;
- $C_3$ to $C_{12}$ cycloalkyl radicals;
- $C_6$ to $C_{18}$ aryl or benzyl radicals; and
- hydrogen.

Control reagents of type (I) are composed preferably of the following further-restricted compounds:

Halogen atoms in these compounds are preferably F, Cl, Br or I, more preferably Cl and Br. Suitable alkyl, alkenyl and alkynyl radicals in various substituents are, outstandingly, both linear and branched chains.

Examples of alkyl radicals containing 1 to 18 carbon atoms are methyl, ethyl, propyl, isopropyl, butyl, isobutyl, t-butyl, pentyl, 2-pentyl, hexyl, heptyl, octyl, 2-ethylhexyl, t-octyl, nonyl, decyl, undecyl, tridecyl, tetradecyl, hexadecyl and octadecyl.

Examples of alkenyl radicals having 3 to 18 carbon atoms are propenyl, 2-butenyl, 3-butenyl, isobutenyl, n-2,4-pentadienyl, 3-methyl-2-butenyl, n-2-octenyl, n-2-dodecenyl, isododecenyl and oleyl.

Examples of alkynyl having 3 to 18 carbon atoms are propynyl, 2-butynyl, 3-butynyl, n-2-octynyl and n-2-octadecynyl.

Examples of hydroxy-substituted alkyl radicals are hydroxypropyl, hydroxybutyl or hydroxyhexyl.

Examples of halogen-substituted alkyl radicals are dichlorobutyl, monobromobutyl or trichlorohexyl.

A suitable $C_2$ to $C_{18}$ heteroalkyl radical having at least one oxygen atom in the carbon chain is —$CH_2$—$CH_2$—O—$CH_2$—$CH_3$, for example. $C_3$ to $C_{12}$ cycloalkyl radicals are for example cyclopropyl, cyclopentyl, cyclohexyl or trimethylcyclohexyl.

$C_6$ to $C_{18}$ aryl radicals are for example phenyl, naphthyl, benzyl, 4-tert-butylbenzyl or further substituted phenyl, such as ethylbenzene, toluene, xylene, mesitylene, isopropylbenzene, dichlorobenzene or bromotoluene.

The above examples serve only as examples of the particular groups of compound, and make no claim to completeness.

In addition it is also possible to employ compounds of the following types as control reagents:

where $R^2$ can likewise be chosen, independently of R and $R^1$, from the group listed above for these radicals.

In the case of the conventional 'RAFT' process polymerization is usually carried on only to low conversions (WO 98/01478 A1) in order to realize molecular weight distributions which are as narrow as possible. As a result of the low conversions, however, these polymers cannot be used as PSAs and in particular not as hotmelt PSAs, since the high residual monomer fraction adversely affects the adhesive performance properties, the residual monomers contaminate the solvent recyclate in the concentration process, and the corresponding self-adhesive tapes would exhibit a very high level of outgassing. In order to circumvent this drawback of low conversions, in one particularly preferred embodiment the polymerization is initiated a plurality of times.

As a further controlled radical polymerization method it is possible to carry out nitroxide-controlled polymerizations. In an advantageous procedure radicals are stabilized using nitroxides of type (Va) or (Vb):

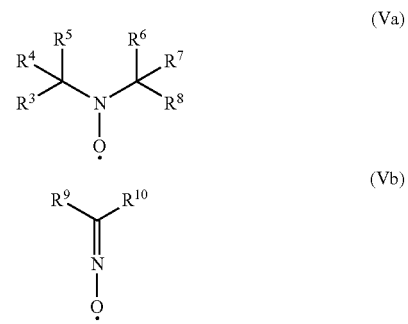

(Va)

(Vb)

in which $R^3$, $R^4$, $R^5$, $R^6$, $R^7$, $R^8$, $R^9$ and $R^{10}$ independently of one another denote the following compounds or atoms:
- i) halides, such as chlorine, bromine or iodine, for example;
- ii) linear, branched, cyclic and heterocyclic hydrocarbons having 1 to 20 carbon atoms, which can be saturated, unsaturated or aromatic;
- iii) esters —$COOR^{11}$, alkoxides —$OR^{12}$ and/or phosphonates —$PO(OR^{13})_2$, where $R^{11}$, $R^{12}$ and $R^{13}$ are radicals from group ii).

Compounds of type (Va) or (Vb) can also be attached to polymer chains of any kind (in which case preferably at least one of the abovementioned radicals represents such a polymer chain) and can hence be used to synthesize polyacrylate PSAs.

More preferred as controlled regulators for the polymerization are compounds of the following type:
2,2,5,5-tetramethyl-1-pyrrolidinyloxyl (PROXYL), 3-carbamoyl-PROXYL, 2,2-dimethyl-4,5-cyclohexyl- PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL
2,2,6,6-tetramethyl-1-piperidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6,-tetraethyl-1-piperidinyloxyl, 2,2,6-trimethyl-6-ethyl-1-piperidinyloxyl
N-tert-butyl 1-phenyl-2-methylpropyl nitroxide
N-tert-butyl 1-(2-naphtyl)-2-methylpropyl nitroxide
N-tert-butyl 1-diethylphosphono-2,2-dimethylpropyl nitroxide
N-tert-butyl 1-dibenzylphosphono-2,2-dimethylpropyl nitroxide
N-(1-phenyl-2-methylpropyl) 1-diethylphosphono-1-methylethyl nitroxide
di-t-butyl nitroxide
diphenyl nitroxide
t-butyl t-amyl nitroxide.

A series of further polymerization methods by which the PSAs may be prepared in alternative procedures can be selected from the prior art:

U.S. Pat. No. 4,581,429 A discloses a controlled-growth radical polymerization process which uses as its initiator a compound of the formula R'R"N—O—Y where Y is a free radical species which is able to polymerize unsaturated monomers. However, the reactions generally have no conversions. A particular problem is the polymerization of acrylates, which proceeds only to very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process in which very specific radical compounds are used, such as phosphorus-containing nitroxides, for example, based on imidazolidine. WO 98/44008 A1 discloses specific nitroxyls based on morpholines, piperazinones and piperazinediones. DE 199 49 352 A1 describes heterocyclic alkoxyamines as regulators in controlled-growth radical polymerizations. Corresponding onward developments of the alkoxyamines and of the corresponding free nitroxides, respectively, improve the efficiency for the preparation of polyacrylates (Hawker, paper to the National Meeting of the American Chemical Society, Spring 1997; Husemann, paper to the IUPAC World-Polymer Meeting 1998, Gold Coast).

A further controlled polymerization method which can be used advantageously to synthesize the poly(meth)acrylates is that of atom transfer radical polymerization (ATRP), which uses as initiator, preferably, monofunctional or difunctional secondary or tertiary halides and, to abstract the halide(s), complexes of Cu, Ni, Fe, Pd, Pt, Ru, Os, Rh, Co, Ir, Ag or Au (EP0824 111 A1; EP826 698A1; EP824 110A1; EP841 346A1; EP 850 957 A1). The various possibilities of ATRP are described further in the publications U.S. Pat. No. 5,945,491 A, U.S. Pat. No. 5,854,364 A and U.S. Pat. No. 5,789,487 A.

Coating Processes, Treatment of the Backing Material with the PSA of the Invention In order to prepare the PSAs of the invention the polymers described above are preferably coated as hotmelt systems (in other words from the melt) or laminated onto one another under hot conditions. For the preparation process it may therefore be necessary to remove the solvent from the poly(meth)acrylates. For this it is possible in principle to use any methods known to the skilled worker. One very preferred method is that of concentration using a single-screw or twin-screw extruder. The twin-screw extruder can be operated with the screws rotating in the same or opposite directions. The solvent or water is preferably distilled off over a number of vacuum stages. Furthermore, compensatory heating is applied depending on the distillation temperature of the solvent. The residual solvent fractions amount to preferably <1%, more preferably <0.5% and very preferably <0.2%. The hotmelt is processed further from the melt.

Moreover, in one preferred embodiment for the layer B of the PSA, the chalk filler is added to the hotmelt in the melt. For homogeneous compounding into the melt it is preferred to use a twin-screw extruder or planetary roll extruder.

In the preferred process the PSAs of the individual layers are coated using an extrusion die, more preferably a coextrusion die. With the coextrusion die the three layers A, B and C are produced in one step. For this form of coating the three polymers are supplied separately to the coextrusion die, thereby also allowing three different layers A, B and C to be produced.

The extrusion dies used may advantageously come from one of the three following categories: T-dies, fishtail dies and coathanger dies. The individual types differ in the design of their flow channel.

For coating it is particularly preferred to apply the adhesive to a backing using a coat-hanger die, specifically in such a way that a movement of die relative to backing forms a polymer layer on the backing.

In one preferred embodiment the PSA of the invention can be processed to a transfer tape. Examples of suitable backing material include all siliconized or fluorinated films having a release effect. As film materials mention may be made here, merely by way of example, of BOPP, MOPP, PET, PVC, PUR, PE, PE/EVA, EPDM, PP and PE. For transfer tapes it is additionally possible to use release papers (glassine papers, craft papers and polyolefin-coated papers).

For optional UV crosslinking the PSA of the invention is irradiated with shortwave ultraviolet radiation in a wavelength range from 200 to 400 nm, depending on the UV photo initiator used, especially using high-pressure or medium-pressure mercury lamps at an output of from 80 to 240 W/cm. The intensity of irradiation is adapted to the particular quantum yield of the UV photoinitiator, the degree of crosslinking to be established and the extent of orientation.

In one preferred crosslinking process the PSA of the invention is crosslinked with electron beams. Typical irradiation equipment which can be employed comprises linear cathode systems, scanner systems or segmented cathode systems, where the equipment in question comprises electron beam accelerators. An exhaustive description of the state of the art and the most important process parameters can be found in Skelhorne, Electron Beam Processing, in Chemistry and Technology of UV and EB Formulation for Coatings, Inks and Paints, Vol. 1, 1991, SITA, London. The typical acceleration voltages are in the range between 50 kV and 500 kV, preferably between 80 kV and 300 kV. The scatter doses employed range between 5 and 150 kGy, in particular between 20 and 100 kGy. It is also possible to employ both crosslinking methods or other methods which allow high-energy irradiation.

EXAMPLES

The invention is described below by examples, without wishing to be restricted unnecessarily by the choice of the samples investigated.

The following test methods were employed.

180° Bond Strength Test (Test A)

An adhesive tape 20 mm wide and composed of an acrylate PSA coated onto a polyester or siliconized release paper was applied to steel (test A1) or PE (test A2) plates. The adhesive tape was pressed onto the substrate twice using a 2 kg weight. Immediately thereafter the adhesive tape was peeled from the substrate at 30 mm/min at an angle of 180°. The steel plates were washed twice with acetone and once with isopropanol. New PE plates were used in each case. The results are reported in N/cm and are averaged from three measurements. All measurements were conducted at room temperature under controlled-climate conditions.

Shear Strength (Test B)

A strip of the adhesive tape 13 mm wide was applied to a smooth steel surface which had been cleaned three times with acetone and once with isopropanol. The area of application was 20 mm*13 mm (length*width). The adhesive tape was subsequently pressed onto the steel substrate four times with a pressure of 2 kg applied. The system was loaded with a 1 kg weight at room temperature. The shear stability times measured are expressed in minutes and correspond to the average of three measurements.

Preparation of the Polymers for Layers A and C

Polymer 1

A 200 l reactor conventional for radical polymerizations was charged with 20 kg of methyl acrylate, 60 kg of 2-ethylhexyl acrylate, 10 kg of acrylic acid and 53.3 kg of acetone/isopropanol (97:3). After nitrogen gas had been passed through it for 45 minutes with stirring the reactor was heated to 58° C. and 40 g of 2,2'-azoisobutyronitrile (AIBN) were added. Subsequently the external heating bath was heated to 75° C. and the reaction was carried out constantly at this external temperature. After 1 hour of reaction a further 40 g of AIBN were added. After 5 hours and 10 hours 15 kg portions of acetone/isopropanol (97:3) were added for dilution. After 6 hours and 8 hours 100 g portions of dicyclohexyl peroxydicarbonate (Perkadox 16® from Akzo Nobel) in solution each in 800 g of acetone were added. After a reaction time of 24 hours the reaction was terminated and cooled to room temperature. The polymer was subsequently freed from the solvent under reduced pressure at 120° C.

Polymer 2

A 200 l reactor conventional for radical polymerizations was charged with 10 kg of N-tert-butylacrylamide, 30 kg of 2-ethylhexyl acrylate, 30 kg of butyl acrylate, 10 kg of acrylic acid and 53.3 kg of acetone/isopropanol (97:3). After nitrogen gas had been passed through it for 45 minutes with stirring the reactor was heated to 58° C. and 40 g of 2,2'-azoisobutyronitrile (AIBN) were added. Subsequently the external heating bath was heated to 75° C. and the reaction was carried out constantly at this external temperature. After 1 hour of reaction a further 40 g of AIBN were added. After 5 hours and 10 hours 15 kg portions of acetone/isopropanol (97:3) were added for dilution. After 6 hours and 8 hours 100 g portions of dicyclohexyl peroxydicarbonate (Perkadox 16® from Akzo Nobel) in solution each in 800 g of acetone were added. After a reaction time of 24 hours the reaction was terminated and cooled to room temperature. The polymer was subsequently freed from the solvent under reduced pressure at 120° C.

Preparation of the Polymers for Layer B

Polymer 3

A 200 l reactor conventional for radical polymerizations was charged with 26 kg of methyl acrylate, 32 kg of 2-ethylhexyl acrylate, 32 kg of butyl acrylate and 53.3 kg of acetone/isopropanol (85:15). After nitrogen gas had been passed through it for 45 minutes with stirring the reactor was heated to 58° C. and 40 g of 2,2'-azoisobutyronitrile (AIBN) were added. Subsequently the external heating bath was heated to 75° C. and the reaction was carried out constantly at this external temperature. After 1 hour of reaction a further 40 g of AIBN were added. After 5 hours and 10 hours 15 kg portions of acetone/isopropanol (85:15) were added for dilution. After 6 hours and 8 hours 100 g portions of dicyclohexyl peroxydicarbonate (Perkadox 16® from Akzo Nobel) in solution each in 800 g of acetone were added. After 24 hours the reaction was terminated and the reaction mixture cooled to room temperature.

The product was subsequently blended with 20% by weight of a C5-C9 HC resin from VFT Rüttgers (TK 90 H), with 35% by weight of chalk (Mikrosöhl), with 5% by weight of a phthalate Palatinol™ AH (BASF AG) and 1% by weight of trifunctional acrylate (SR 444 from Cray Valley) in solution and the blend was subsequently freed from solvent under reduced pressure at 120° C.

Polymer 4

A 200 l reactor conventional for radical polymerizations was charged with 26 kg of isobornyl acrylate, 32 kg of 2-ethylhexyl acrylate, 32 kg of butyl acrylate and 53.3 kg of acetone/isopropanol (85:15). After nitrogen gas had been passed through it for 45 minutes with stirring the reactor was heated to 58° C. and 40 g of 2,2'-azoisobutyronitrile (AIBN) were added. Subsequently the external heating bath was heated to 75° C. and the reaction was carried out constantly at this external temperature. After 1 hour of reaction a further 40 g of AIBN were added. After 5 hours and 10 hours 15 kg portions of acetone/special boiling point spirit 60/95 (50:50) were added for dilution. After 6 hours and 8 hours 100 g portions of dicyclohexyl peroxydicarbonate (Perkadox 16® from Akzo Nobel) in solution each in 800 g of acetone were added. After 24 hours the reaction was terminated and the reaction mixture cooled to room temperature.

The product was subsequently blended with 20% by weight of a C5-C9 HC resin from VFT Rüttgers (TK 90 H), with 40% by weight of chalk (Mikrosöhl) and 1% by weight of trifunctional acrylate (SR 444 from Cray Valley) in solution and the blend was subsequently freed from solvent under reduced pressure at 120° C.

Example 1

Layer A: Polymer 1 (25 g/m$^2$)
Layer B: Polymer 3 (200 g/m$^2$)
Layer C: Polymer 1 (25 g/m$^2$)

Example 2

Layer A: Polymer 2 (25 g/m$^2$)
Layer B: Polymer 3 (200 g/m$^2$)
Layer C: Polymer 2 (25 g/m$^2$)

Example 3

Layer A: Polymer 2 (25 g/m$^2$)
Layer B: Polymer 3 (200 g/m$^2$)
Layer C: Polymer 2 (25 g/m$^2$)

Example 4

Layer A: Polymer 2 (25 g/m$^2$)
Layer B: Polymer 4 (200 g/m$^2$)
Layer C: Polymer 2 (25 g/m$^2$)

Production of the Examples

Polymers 1 and 2 were coated from solution onto a glassine release paper coated with 1.5 g/m² silicone (polydimethylsiloxane), using a coating bar. The polymers were subsequently dried in a drying tunnel at max. 120° C. and a belt speed of 10 mm/min.

Electron beam crosslinking took place using an instrument from Electron Crosslinking AB, Halmstad, Sweden. The coated and dried polymer was conveyed below the Lenard window of the accelerator, passing via a chill roll which is present as standard. In the zone of irradiation, the atmospheric oxygen was displaced by flushing with pure nitrogen.

The belt speed was in each case 10 mm/min. Irradiation was carried out with an acceleration voltage of 180 kV and with a dose of 30 kilograys (kGy).

Polymer layer B was coated onto polymer 1 or 2 using a coat hanger extrusion die with a die slot of 600 µm and a coating width of 33 cm at a product temperature of 170° C. with a belt speed of 10 mm/min. The layer thickness was 200 µm. Subsequently the PSA of the invention was produced by laminating layer C onto layer B via a roll heated to 90° C.

Electron beam crosslinking of layers B and C was carried out using an instrument from Electron Crosslinking AB, Halmstad, Sweden, from above through layer C. The coated PSA tape was conveyed below the Lenard window of the accelerator, passing via a chill roll which is present as standard. In the zone of irradiation, the atmospheric oxygen was displaced by flushing with pure nitrogen. The belt speed was in each case 10 mm/min. Irradiation was carried out with an acceleration voltage of 230 kV and with a dose of 30 kilograys (kGy).

Results

To assess the adhesive performance properties, test methods A and B were carried out. Table 1 below summarizes the adhesive performance data for Examples 1 to 4.

TABLE 1

Overview of the adhesive performance properties found

| Example | Bond strength on steel (test A1) | Bond strength on PE (test A2) | Sheer stability times (test B) |
|---|---|---|---|
| 1 | 10.2 N/cm | 2.7 N/cm | +10 000 min |
| 2 | 11.3 N/cm | 3.0 N/cm | +10 000 min |
| 3 | 10.5 N/cm | 2.5 N/cm | +10 000 min |
| 4 | 12.1 N/cm | 3.2 N/cm | +10 000 min |

The result "+10 000 min" is intended to denote that after 10 000 min the test was discontinued.

Comparison of the adhesive performance properties shows that with the pressure-sensitive adhesives of the invention very high shear strengths and, at the same time, relatively high bond strengths are achieved both on steel and on polyethylene.

| List of reference numerals used | |
|---|---|
| 1 | Layer A |
| 2 | Layer B |
| 3 | Layer C |

The invention claimed is:

1. Layered pressure-sensitive adhesive comprising:
   (a) a first layer of a first polyacrylate pressure-sensitive adhesive containing at least 50% by weight, based on the first polyacrylate pressure-sensitive adhesive, of an acrylic and/or methacrylic ester of the formula $CH_2=CH(R_1)(COOR_2)$ where $R_1$ is H or $CH_3$ and $R_2$ is a linear, branched or cyclic alkyl chain having 1 to 20 carbon atoms, wherein said first layer does not comprise chalk;
   (b) a second layer comprising:
      (b1) a polyacrylate containing at least 50% by weight, based on the polyacrylate, of an acrylic and/or methacrylic ester of the formula $CH_2=CH(R_1)(COOR_2)$ where $R_1$ is H or $CH_3$ and $R_2$ is a linear, branched or cyclic alkyl chain having 1 to 20 carbon atoms, and
      (b2) at least 15% by weight, based on the second layer, of chalk; and
   (c) a third layer of a second polyacrylate pressure-sensitive adhesive containing at least 50% by weight, based on the second polyacrylate pressure-sensitive adhesive, of an acrylic and/or methacrylic ester of the formula $CH_2=CH(R_1)(COOR_2)$ where $R_1$ is H or $CH_3$ and $R_2$ is a linear, branched or cyclic alkyl chain having 1 to 20 carbon atoms, wherein said third layer does not comprise chalk, wherein said second layer is between said first layer and said third layer.

2. Layered pressure-sensitive adhesive according to claim 1, wherein the first layer and the third layer have the same composition.

3. Layered pressure-sensitive adhesive according to claim 1, wherein the first polyacrylate pressure-sensitive adhesive, the second polyacrylate pressure-sensitive adhesive and the polyacrylate of the second layer have the same composition.

4. Layered pressure-sensitive adhesive according claim 1, wherein the second layer comprises not more than 60% by weight of chalk.

5. Layered pressure-sensitive adhesive according claim 1, wherein to the first layer has a thickness of from 5 to 150 jam, the second layer a thickness of from 10 µm to 1500 µm and the third layer a thickness of from 5 to 150 µm.

6. Process for preparing a layered pressure-sensitive adhesive according to claim 1, comprising adding the chalk to the polyacrylate of layer B, which is in the melt, and subsequently homogeneously distributing the chalk in the melt.

7. A pressure-sensitive adhesive tape comprising the layered pressure-sensitive adhesive according to claim 1.

8. The pressure-sensitive adhesive tape according to claim 7, which is a transfer tape.

9. A method of adhering an adhesive tape to a substrate, said method comprising adhering the pressure-sensitive adhesive tape according to claim 7 to said substrate.

10. The method according to claim 9, wherein the pressure-sensitive adhesive tape is a transfer tape.

* * * * *

UNITED STATES PATENT AND TRADEMARK OFFICE
CERTIFICATE OF CORRECTION

PATENT NO. : 7,498,078 B2
APPLICATION NO. : 11/013559
DATED : March 3, 2009
INVENTOR(S) : Husemann et al.

It is certified that error appears in the above-identified patent and that said Letters Patent is hereby corrected as shown below:

In the Specification

Column 5, line 2, "$\leqq$" should read -- $\leq$ --.

In the Claims

Column 14, line 7, "CH" should read -- $CH_2$ --.

Column 14, line 43, "150jam" should read -- 150μm --.

Signed and Sealed this
Eleventh Day of February, 2014

Michelle K. Lee
*Deputy Director of the United States Patent and Trademark Office*